United States Patent [19]

Lidbrink et al.

[11] Patent Number: 5,625,866
[45] Date of Patent: Apr. 29, 1997

[54] MOBILE TELECOMMUNICATION SYSTEM HAVING AN AUXILIARY ROUTING ARRANGEMENT

[75] Inventors: Stefan Lidbrink; Henrik Rosenlund, both of Haninge, Sweden

[73] Assignee: Televerket, Farsta, Sweden

[21] Appl. No.: 422,773

[22] Filed: Apr. 14, 1995

Related U.S. Application Data

[63] Continuation of Ser. No. 221,458, Apr. 1, 1994, abandoned, which is a continuation of Ser. No. 989,547, Dec. 11, 1992, abandoned.

[30] Foreign Application Priority Data

Dec. 12, 1991 [SE] Sweden .................................. 9103681

[51] Int. Cl.$^6$ ........................ H04B 17/00; H04Q 07/30
[52] U.S. Cl. ........................ 455/8; 455/33.1; 455/34.1; 455/54.1; 455/67.1
[58] Field of Search .................................. 455/8, 9, 33.1, 455/34.1, 53.1, 54.1, 56.1, 67.1, 68, 62, 34.2; 370/16; 379/60, 63, 59

[56] References Cited

U.S. PATENT DOCUMENTS

| | | | |
|---|---|---|---|
| 2,699,495 | 1/1955 | Magnuski et al. | 455/8 |
| 4,039,947 | 8/1977 | Miedema | 455/8 |
| 4,878,048 | 10/1989 | Gottesman et al. | |
| 4,947,451 | 8/1990 | Nawata | 455/8 |
| 4,984,252 | 1/1991 | Morimoto | 455/8 |
| 4,985,904 | 1/1991 | Ogawara | 455/8 |
| 5,095,530 | 3/1992 | Tanaka et al. | 455/68 |
| 5,153,874 | 10/1992 | Kohno | 370/16 |
| 5,157,667 | 10/1992 | Carusone, Jr. et al. | 455/8 |
| 5,182,744 | 1/1993 | Askew et al. | 370/16 |

FOREIGN PATENT DOCUMENTS

| | | | |
|---|---|---|---|
| 0198122 | 8/1989 | Japan | 455/8 |
| 0108916 | 5/1991 | Japan | 455/67.1 |

*Primary Examiner*—Reinhard J. Eisenzopf
*Assistant Examiner*—Nguyen Vo
*Attorney, Agent, or Firm*—Oblon, Spivak, McClelland, Maier & Neustadt, P.C.

[57] ABSTRACT

The invention relates to a mobile telecommunication system having an auxiliary routing arrangement comprising auxiliary radio channel units and monitoring circuit. The auxiliary radio channel units are arranged in the base station of the system and the monitoring circuit are arranged in the mobile telephone switch of the system. The monitoring circuit monitor the setting-up of each call in the mobile telephone switch and, when faults occur, the monitoring circuit are adapted switch off the transmitter function of an affected radio channel unit and to replace the affected radio channel unit with an auxiliary radio channel unit which is allocated a frequency essentially corresponding to the frequency of the affected radio channel unit. The automatic replacement of an affected radio channel unit with an auxiliary radio channel unit ensures that the traffic handling capacity of the system is essentially unchanged.

18 Claims, 1 Drawing Sheet

MOBILE TELECOMMUNICATION SYSTEM HAVING AN AUXILIARY ROUTING ARRANGEMENT

This application is a continuation of application Ser. No. 08/221,458, filed on Apr. 1, 1994, now abandoned, which is a continuation application Ser. No. 07/989,547, filed on Dec. 11, 1992, now abandoned.

BACKGROUND OF THE INVENTION

The invention relates to a mobile telecommunication system having an auxiliary routing arrangement.

Known mobile telecommunication systems most frequently comprise a number of mobile telephone switches which are connected to one or a number of base stations that have a number of mobile telephone units associated therewith. Each base station is allocated a number of radio frequencies and preferably has a separate radio channel unit for each of the allocated frequencies, each one of the radio channel units being thereby adapted to operate a different frequency.

With mobile telecommunication systems operating in an area with a high traffic capacity, the respective base station utilises a maximum number of radio channel units and the number of radio frequencies allocated to the base station corresponds to the number of radio channel units.

It is known in a mobile telecommunication system to have an auxiliary routing arrangement between a base station and a mobile telephone unit. In such systems, the base station includes elements that can function as an auxiliary route for a faulty radio channel unit.

It is characteristic of the known mobile telecommunication systems that the auxiliary routes are allocated their own radio frequency and that the radio frequency of the faulty radio channel unit which is not handling traffic, remains blocked until the faulty radio channel unit is repaired and is put into operation again.

Mobile telecommunication systems are also known in which an essentially unchanged traffic-handling capacity is retained, when faults occur in any one or more of the radio channel units of a base station, by having a number of radio channels of the base station on stand-by i.e. set aside for use as and when required. With such an arrangement, the stand-by radio channels are intended for use as spare radio channel units that have to be manually connected into the system by service engineering personnel when one or a more of the radio channel units of the base station have ceased to handle traffic.

With present day telecommunication transmission in mobile systems, there is a great need to be able to utilise the frequency band, which is a limited natural resource, as effectively as possible whilst at the same time being able to retain good preparedness for faults which can occur in part-components, such as the radio channel units, that form part of the mobile telecommunication system. It is, therefore, essential that resources in which faults have occurred and been corrected should be brought back into service as quickly as possible and that faulty part-components, such as radio channel units, are replaced in such a manner that the on-going traffic is disturbed as little as possible. There is also a need for these functions to be effected in an automatic manner, for example, by means of the mobile telephone switch, and not, as is the case with known systems, by the use of manual resources.

There is also a need in mobile telecommunication systems of this category to ensure that the proportion of the radio frequencies allocated to the system which can be actively worked, is as large as possible and is preferably the majority of the radio frequencies.

Furthermore, there is also a need to have an auxiliary routing arrangement for the mobile telecommunication system in order to ensure that the traffic handling capacity of the system remains unchanged when one or more of the radio channel units of the system become faulty and/or cease to handle an adequate level of traffic.

With remotely located base stations in which the number of actively worked radio channel units is not very large, there is also a need to be able to replace a radio channel unit which ceases to handle traffic, with a new functioning radio channel unit without having to send service engineering personnel to the remote location as soon as a fault occurs. The most cost effective way of achieving this is to delay the visit of the service engineering personnel to the remote location until a number of fault reports have been collected.

It is also essential to ensure that, on replacing a faulty radio channel unit which is not handling traffic, the transmitter function of the faulty radio channel unit is switched off in a suitable way and that a fault message is sent to a central operator station or central service station so that suitable measures can be taken to correct the fault and bring the faulty radio channel unit back into service as quickly as possible.

It is an object of the present invention to overcome the problems of known systems and to satisfy the foregoing needs by the provision of a mobile telecommunication system wherein the or each base station has an auxiliary routing arrangement that is adapted to retain an essentially unchanged traffic handling capacity for the telecommunication system even in situations in which one or more radio channel units cease to handle traffic, and become faulty, and wherein the auxiliary routing arrangement is adapted for operation at any of the frequencies which are allocated to the respective base station in the system. The mobile telecommunication system according to the present invention can therefore maintain a high preparedness for the occurrence of one or more faulty radio channel units which are not handling traffic, but can still operate with the majority of the frequencies allocated to the respective base station.

SUMMARY OF THE INVENTION

The invention provides a mobile telecommunication system comprising at least one mobile telephone switch having at least one base station connected thereto, the said at least one base station having at least one radio channel unit associated therewith which is adapted to operate at a frequency that is unique to the said at least one radio channel unit, at least one mobile telephone unit adapted for radio communication on the said at least one radio channel unit, at least one auxiliary radio channel unit for the said at least one base station which is adapted for operation at the frequency of operation of the said at least one radio channel unit, and means for monitoring the traffic handling capacity of the said at least one radio channel unit, for deactivating the said at least one radio channel unit when its traffic handling capacity ceases or falls below a level at which it cannot effect traffic handling for a predetermined period of time, and for activating the said at least one auxiliary radio channel unit to replace, and to operate at the frequency of operation of, the deactivated radio channel unit.

In a preferred arrangement, the monitoring means which operate automatically and do not, therefore, require the use of manual resources, form part of the mobile telephone switch. However, the activation and deactivation of the radio channel units can also be carried out manually from a central operator station or a central service station.

The mobile telecommunication system according to the present invention preferably comprises a plurality of base stations which are connected to at least one mobile switch, which are each allocated a number of radio frequencies and which each have a separate radio channel unit for each of the allocated frequencies. Each of the radio channel units are, therefore, adapted to operate at a different frequency.

Also, each of the base stations of the system has at least one auxiliary radio channel unit adapted for operation at any one of the frequencies that have been allocated to the base station.

Furthermore, the system arrangement is such that when any one of the radio channel units of a base station is deactivated by the monitoring means, the auxiliary radio channel unit of the base station is automatically activated by the monitoring means to replace, and to operate at the frequency of operation of, the deactivated radio channel unit.

The automatic activation of an auxiliary radio channel unit is effected in a predetermined period of time T1 after the deactivation of the radio channel unit that it is replacing. The time TI is adjustable within a predetermined range, for example, 0 to 60 seconds.

The monitoring means are also adapted to switch off the radio transmitter function of a radio channel unit as and when it is deactivated and replaced by an auxiliary radio channel unit.

The monitoring means are also adapted to monitor the setting-up of each call in the mobile telephone switch and to store for each of the radio channel units information concerning the unsuccessful attempts to set-up a call. The stored information is used by the monitoring means to make a determination as to whether or not the radio channel unit concerned should be replaced by an auxiliary radio channel unit.

When the traffic handling capacity of a radio channel unit ceases or falls below a level at which it cannot effect traffic handling for a predetermined period of time, the mobile telephone switch is adapted to send a fault message to the central control station, i.e. to a central operator station, or alternatively, to a central service station for effecting the allocation of the necessary resources at the appropriate time to repair the faulty radio channel unit.

When a deactivated radio channel unit has been repaired by service engineering personnel and its traffic handling capacity has been restored, it is automatically reactivated in a predetermined period of time TO after its traffic handling capacity has been restored. The time TO is adjustable within a predetermined range, for example, 0 to 60 seconds.

The number of auxiliary radio channel units allocated to a base station is in proportion to the capability of the central control station to effect the repair of a radio channel which becomes faulty or ceases to handling traffic, or to the probability that a radio channel unit will become faulty or will ceases to handle traffic.

The foregoing and other features according to the present invention will be better understood from the following description with reference to FIG. 1 of the accompanying drawings which diagrammatically illustrates, in the form of a block diagram, a mobile telecommunication system according to the present invention.

The mobile telecommunication system according to the present invention is a mobile trunked communications system of the NMT type.

Figure 1:
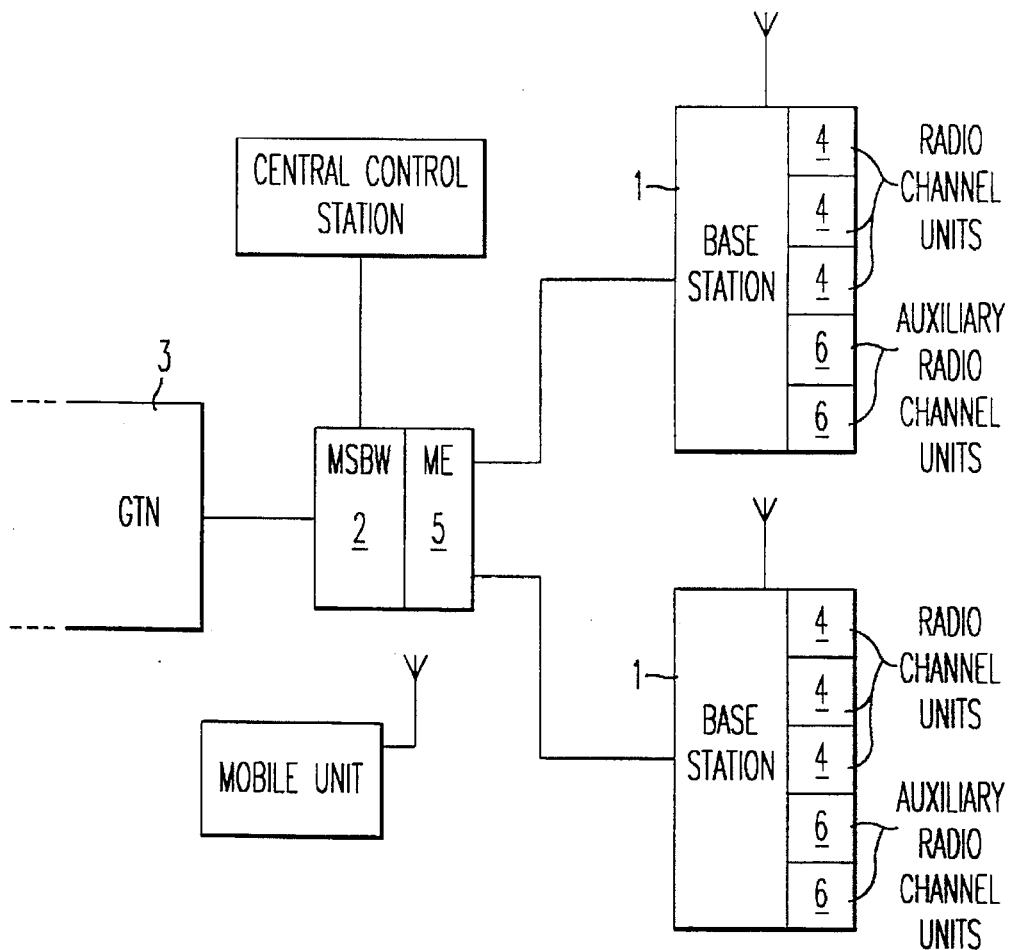
FIG. 1 is a diagram sketch of the mobile telecommunication system according to this invention.
Figure 2:
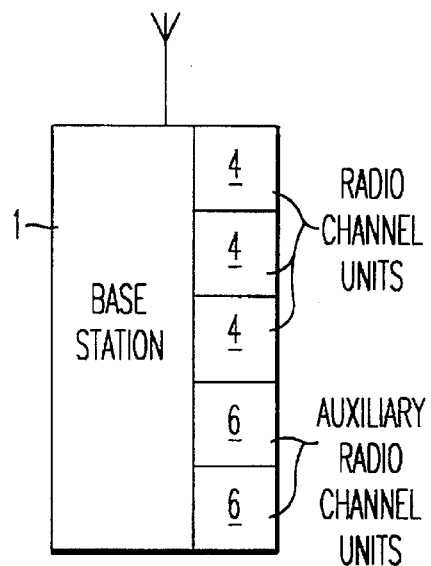
FIG. 2 is an expanded drawing of the base station allocation in FIG. 1.

As is diagrammatically illustrated in FIG. 1 of the drawings, the mobile telecommunication system according to the invention includes one or a number of base stations 1 which are connected to one or a number of mobile telephone switches 2, and a number of mobile telephone units (not illustrated). The mobile telephone switch 2 is the central unit of the system and provides the interface between the mobile telecommunication system and the general telephone network 3. The base stations 1 are the intermediate links, without switching function, between the wire-connected connection and the radio connection with the mobile telephone units. Each of the base stations 1 has a number of radio channel units 4 corresponding to the number of frequencies allocated to the base station, each channel unit 4 being allocated one radio channel frequency.

The mobile telecommunication system is provided with one or a number of monitoring elements 5 which (MES), as is illustrated in FIG. 1, preferably form part of the mobile telephone switch 2 (MBSW), and with one or a number of auxiliary radio channel units 6 at one or a number of base stations 1.

The monitoring elements 5 monitor the setting-up of each call in the mobile telephone switch 2 by a radio channel unit 4 of a base station 1. If the attempt to set-up a call is unsuccessful, then information concerning this call is stored in the monitoring element 5. After a predetermined number of unsuccessful attempts to set-up a call by one and the same radio channel unit 4, the monitoring element 5 automatically causes the transmitter function of the radio channel unit 4 to be switched off and thereby effect deactivation of the radio channel unit. After a predetermined period of time T1, an auxiliary radio channel unit 6 is activated by the monitoring elements 5 to replace, and to operate at a frequency corresponding to the frequency of, the deactivated radio channel unit 4. An error message is created in the mobile telephone switch 2 which forwards it to a central operator station, or alternatively, to a central control station. When the central control station, or alternatively, the central operator station, receives the message, it can then allocate service engineering personnel resources for effecting repair of the faulty radio channel unit. After the faulty radio channel unit has been repaired, it is automatically reactivated by the monitoring element 5, i.e. its transmitter function is switched on. The reactivation of the radio channel unit is effected in a predetermined period of time TO after its traffic handling capacity has been restored, the time TO being adjustable within a predetermined time interval of, for example 0 to 60 seconds.

We claim:

1. A mobile telecommunication system comprising:
    at least one base station comprising:
        plural radio channel units, each adapted to operate at a respective unique frequency, and
        at least one auxiliary radio channel unit adapted to operate at each of the respective unique frequencies;
    at least one mobile telephone unit adapted for radio communication on at least one of the respective unique frequencies; and
    at least one mobile telephone switch connected to said at least one base station, said at least one mobile telephone switch comprising:

means for monitoring a traffic handling capacity of said plural radio channel units, means for deactivating one of said plural radio channel units when the traffic handling capacity of the deactivated one of said plural radio channel units ceases or falls below a predetermined level for a given period of time, and means for activating said at least one auxiliary radio channel unit to replace the deactivated one of said plural radio channel units and to operate at a frequency of operation of the deactivated one of said plural radio channel units.

2. A mobile telecommunication system as claimed in claim 1, wherein the means for monitoring switches off a radio transmitter function of the deactivated one of said plural radio channel units when the deactivated one of said plural radio channel units is replaced by said auxiliary radio channel unit.

3. A mobile telecommunication system as claimed in claim 1, wherein:

the means for monitoring monitors a set-up of each call in the at least one mobile telephone switch and stores information concerning unsuccessful attempts to set up a call for any one of said plural radio channel units, and the stored information is used by the monitoring means to make a determination as to whether or not said any one of said plural radio channel units should be replaced by said auxiliary radio channel unit.

4. A mobile telecommunications system as claimed in claim 1, wherein the at least one mobile telephone switch further comprises:

a transmitter for sending a fault message to a central control station when the traffic handling capacity of a radio channel unit ceases or falls below a predetermined level for a given period of time.

5. A mobile telecommunications system as claimed in claim 1, wherein the deactivated one of said plural radio channel units is automatically reactivated when the traffic handling capacity of the deactivated one of said plural radio channel units has been restored.

6. A mobile telecommunications system as claimed in claim 5, wherein the deactivated one of said radio channel units is automatically reactivated in a predetermined period of time after the traffic handling capacity of the deactivated one of said radio channel units has been restored, wherein the activation of said at least one auxiliary radio channel unit is effected automatically in a predetermined period of time after the deactivation of the deactivated one of said radio channel units, and wherein all of the predetermined periods of time are adjustable within a predetermined range.

7. A mobile telecommunication system as claimed in claim 6, wherein the predetermined range within which all of the predetermined periods of time are adjustable is from 0 to 60 seconds.

8. A mobile telecommunication system as claimed in claim 1, further comprising:

means to activate/deactivate at least one of said plural radio channel units from a central control station either manually or automatically.

9. A mobile telecommunication system as claimed in claim 1, wherein the number of auxiliary radio channel units allocated to said at least one base station is in proportion to a capability of a central control station to effect repair of the deactivated one of said plural radio channel units.

10. A mobile telecommunication system as claimed in claim 1, wherein the number of auxiliary radio channel units allocated to said at least one base station is in proportion to probability that one of said plural radio channel units will become faulty or will cease to handle traffic.

11. A mobile telecommunications system as claimed in claim 1, further comprising a telephone network.

12. The mobile telecommunications system according to claim 1, wherein said plural radio channel units comprise plural separate radio channel units.

13. A mobile telecommunication system comprising:

a plurality of base stations, each of said base stations being allocated a number of radio frequencies and comprising:

plural separate radio channel units, wherein a separate radio channel unit is provided for each of the allocated radio frequencies, and at least one auxiliary radio channel unit which is adapted for operation at any one of the allocated radio frequencies;

a plurality of mobile telephone units adapted for radio communication on at least one of the allocated radio frequencies; and a mobile telephone switch connected to said plurality of base stations, said mobile telephone switch comprising:

means for monitoring a traffic handling capacity of said plural separate radio channel units of said plurality of base stations, means for deactivating any one of said plural separate radio channel units of respective one of said of base stations when the traffic handling capacity of the deactivated one of said plural separate radio channel units ceases or falls below a predetermined level for a given period of time, and means for activating said at least one auxiliary radio channel unit of the respective one of said plurality of base stations to replace the deactivated one of said plural separate radio channel units and to operate at a frequency of operation of the deactivated one of said separate radio channel units.

14. A mobile telecommunications system as claimed in claim 13, wherein said mobile telephone switch is adapted to send a fault message to a central control station when the traffic handling capacity of one of said plural radio channel units ceases or falls below a predetermined level for a given period of time.

15. A mobile telecommunications system as claimed in claim 13 or claim 14, wherein the deactivated one of said plural radio channel units is automatically reactivated in a predetermined period of time after the traffic handling capacity of the deactivated one of said plural radio channel units has been restored, wherein the activation of said at least one auxiliary radio channel unit is effected automatically in a predetermined period of time after deactivating the deactivated one of said plural radio channel units, and wherein all of the predetermined periods of time are adjustable within a predetermined range.

16. A mobile telecommunication system comprising:

a central control station;

a plurality of base stations, each of the base stations being allocated plural radio frequencies and comprising:

plural separate radio channel units, wherein a separate radio channel unit is provided for each of the plural allocated radio frequencies, and a plurality of auxiliary radio channel units which are adapted for operation at any one of the plural allocated radio frequencies of a respective base station, a number of auxiliary radio channel units allocated to a base station being in proportion to at least one of a probability that one of said plural separate radio channel units will become faulty or cease to handle traffic and a capability of the central control station to effect repair of one of said plural separate radio channel units which becomes faulty or ceases to handle traffic;

a plurality of mobile telephone units adapted for radio communication on at least one of the plural allocated radio frequencies; and at least one mobile telephone switch including monitoring means, said monitoring means comprising:
 means for monitoring a set-up of each call,
 means for storing information concerning unsuccessful attempts to set-up a call for any one of said plural separate radio channel units,
 means for automatically deactivating one of said plural separate radio channel units of one of said plurality of base stations after a predetermined number of unsuccessful attempts to set-up a call on the deactivated one of said plural separate radio channel units has been stored by the means for storing, and
 means for activating an auxiliary radio channel unit of the respective base station of the deactivated one of said plural radio channel units, the activated auxiliary radio channel unit operating at a frequency of operation of the deactivated one of said plural separate radio channel units, wherein a fault message is sent to the central control station by said at least one mobile telephone switch when the deactivated one of said plural separate radio channel units is deactivated, and wherein the deactivated one of said plural separate radio channel units is automatically reactivated when a traffic handling capacity of the deactivated one of said plural separate radio channel units has been restored.

17. A mobile telecommunications system as claimed in claim 16, wherein the mobile telecommunication system is a mobile trunked telecommunication system.

18. In a mobile telecommunications system for communication, the improvement comprising:
 at least one base station comprising:
  plural radio channel units, each operating at a respective unique frequency,
  at least one auxiliary radio channel unit adapted to operate at each of the respective unique frequencies of said plural radio channel units; and at least one mobile telephone switch connected to said at least one base station, said at least one mobile telephone switch comprising:
 means for monitoring a traffic handling capacity of said plural radio channel units,
 means for deactivating one of said plural radio channel units when the traffic handling capacity of the deactivated one of sad plural radio channel units ceases or falls below a predetermined level for a predetermined period of time, and
 means for activating said at least one auxiliary radio channel unit to replace the deactivated one of said plural radio channel units and to operate at a frequency of operation of the deactivated one of said plural radio channel units.

* * * * *